United States Patent [19]

Venkataramani et al.

[11] Patent Number: 5,367,871
[45] Date of Patent: Nov. 29, 1994

[54] AIRCRAFT ENGINE IGNITION SYSTEM

[75] Inventors: Kattalaicheri S. Venkataramani, West Chester; John C. Scott, Cincinnati, both of Ohio

[73] Assignee: General Electric Company, Cincinnati, Ohio

[21] Appl. No.: 46,707

[22] Filed: Apr. 16, 1993

Related U.S. Application Data

[62] Division of Ser. No. 919,795, Jul. 27, 1992, Pat. No. 5,257,500.

[51] Int. Cl.$^5$ ............................................. F02C 7/264
[52] U.S. Cl. ........................... 60/39.821; 60/39.827; 315/111.21; 431/263; 219/121.5; 219/121.52
[58] Field of Search ............ 60/39.821, 39.826, 39.827; 219/121.5, 121.51, 121.52; 315/111.21; 431/258, 263

[56] References Cited

U.S. PATENT DOCUMENTS

| | | |
|---|---|---|
| 2,447,758 | 8/1948 | Lubbock et al. |
| 2,942,420 | 6/1960 | Clark . |
| 3,057,159 | 10/1962 | Benedict .......................... 60/39.827 |
| 3,073,121 | 1/1963 | Baker et al. . |
| 3,088,282 | 5/1963 | Logan . |
| 3,448,333 | 6/1969 | Arkless et al. ................. 315/111.21 |
| 3,750,392 | 8/1973 | Zoll . |
| 3,869,593 | 3/1975 | New et al. ....................... 219/121.52 |
| 3,990,834 | 11/1976 | Du Bell et al. ..................... 431/263 |
| 4,125,754 | 11/1978 | Wasserman et al. ............. 219/121.5 |
| 4,147,916 | 4/1979 | Fairbairn ........................ 219/121.52 |
| 4,215,979 | 8/1980 | Morisha ............................ 431/263 |
| 4,650,953 | 3/1987 | Eger et al. ....................... 219/121.5 |
| 4,752,667 | 6/1988 | Blanchard et al. ............. 219/121.52 |
| 4,882,465 | 11/1989 | Smith et al. .................... 315/111.21 |
| 5,109,669 | 5/1992 | Morris et al. .................... 60/39.821 |

FOREIGN PATENT DOCUMENTS

| | | |
|---|---|---|
| 694373 | 7/1953 | United Kingdom . |
| 832771 | 4/1960 | United Kingdom . |
| 1226336 | 3/1971 | United Kingdom . |
| 0191275 | 1/1967 | U.S.S.R. . |

OTHER PUBLICATIONS

Nature, vol. 272, Mar. 1978, pp. 341–343, Ignition By Plasma Jet, by F. J. Weinberg.

Eighteen Symposium (International) on Combustion, The Combustion Institute, 1981, pp. 1755–1765, A Study of Plasma Jet Ignition Mechanisms, by J. E. Orrin, I. M. Vince and F. J. Weinberg.

Nineteenth Symposium (International) on Combustion, The Combustion Institute, 1982, pp. 1467–1474, Plasma Jet Ignition In A Lean-Burn CFR Engine, by Luigi Tozzi and Eli K. Dabora.

Nineteenth Symposium (International) on Combustion, The Combustion Institute, 1982, pp. 1523–1531, Energy and Radical Losses From Plasma Jet Igniters To Solid Surfaces, by F. B. Carleton, I. M. Vince and F. J. Weinberg.

*Primary Examiner*—Richard A. Bertsch
*Assistant Examiner*—Michael Kocharov
*Attorney, Agent, or Firm*—Jerome C. Squillaro; Nathan D. Herkamp

[57] ABSTRACT

A plasma jet igniter is used to reliably relight a jet engine at high altitudes under adverse combustion conditions. The air-fuel mixture from the primary combustion zone of the jet engine combustor may be used as the plasma medium or, alternatively, liquid fuel direct from the aircraft fuel system may be used as a fuel charge.

5 Claims, 5 Drawing Sheets

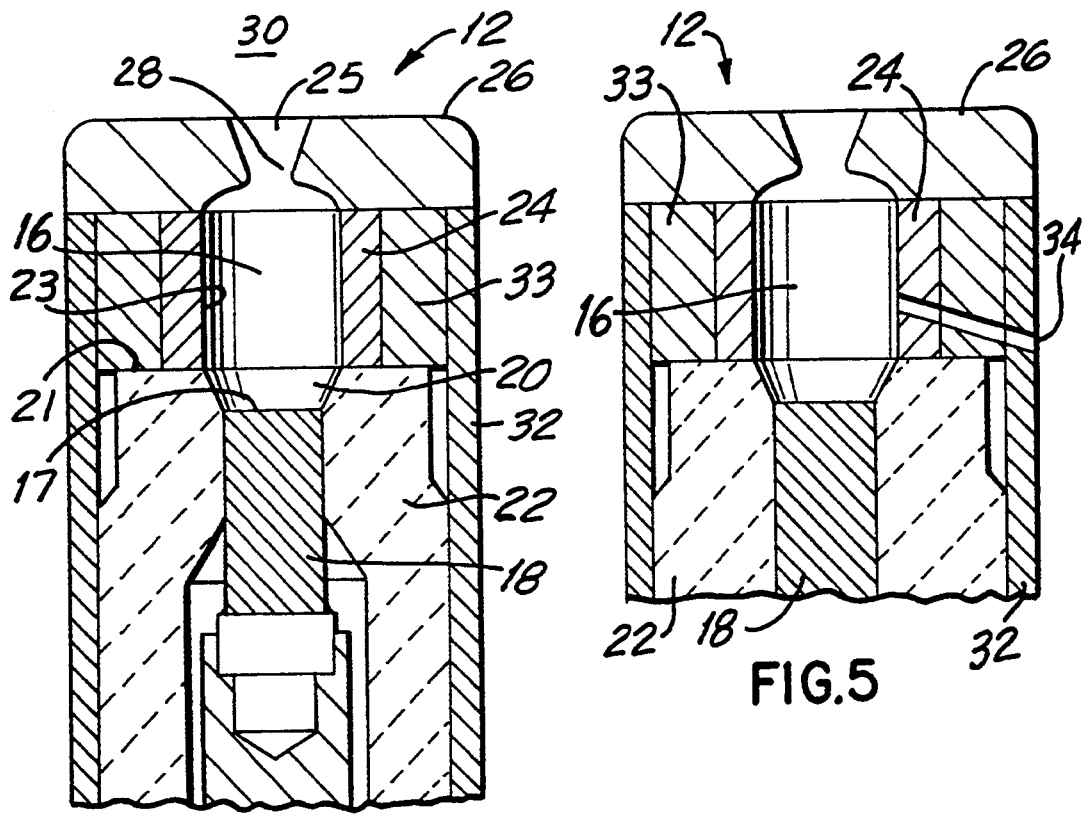
FIG.4
FIG.5
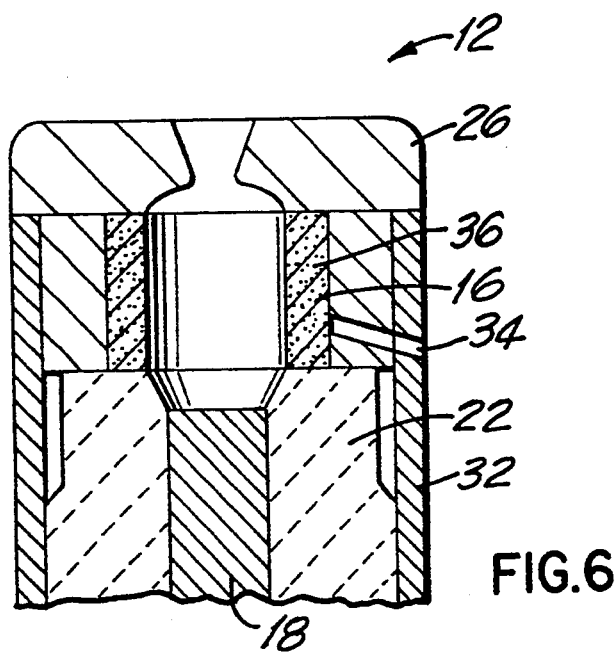
FIG.6

AIRCRAFT ENGINE IGNITION SYSTEM

This is a division of application Ser. No. 07/919,795, filed Jul. 27, 1992 now U.S. Pat. No. 5,257,500.

BACKGROUND OF THE INVENTION

1. Field of the Invention

The present invention relates in general to the ignition of fuels and relates in particular to the ignition of jet aircraft fuels at high altitudes using a plasma jet igniter.

2. Description of Prior Developments

Efforts have been underway for many years to improve the relight capability of jet engines and the like, particularly when such engines are operating at high altitudes and/or under adverse weather conditions. For example, jet aircraft operation within turbulent weather such as accompanies thunderstorms can cause a jet engine to "flame out".

It is critical that an ignition system be provided which will reliably relight the jet engine combustor during flight. Reliability of a relight system is particularly important at high altitudes where low entrance pressure and temperature conditions exist while the engine is "windmilling".

The ability to relight a jet engine at high altitudes is dependent upon the capability of the ignition system, the combustor geometry and air flow split, the quality of the spray produced by the fuel nozzle, the fuel properties and the combustor inlet conditions during windmilling. Of all of these factors, focus is presently concentrated on improvements in ignition system performance.

Conventional aircraft engine ignition systems include a spark igniter energized by a high voltage exciter circuit with a spark igniter located in the primary zone of the combustor. The spark discharge ignites a mixture of fuel and air in the combustor's primary zone and produces a kernel of hot combustion products. If the rate of heat loss from the ignition kernel is less than the rate of heat production in the kernel, the ignition front advances leading to combustor light-off. Most conventional ignition systems require a nearly stoichiometric fuel-air mixture in the vicinity of the igniter and favorable aerodynamic conditions such as a large recirculation zone for optimal operation.

A need currently exists for an improved ignition system for a jet engine combustor which reliably operates under wider operating conditions than possible using conventional spark igniters. A particular need exists for such a system which will reliably operate at high altitudes and/or under adverse operating conditions such as exist during turbulent weather. A further need exists for such a system which does not require a stoichiometric fuel-air mixture for light-off.

SUMMARY OF THE INVENTION

The present invention has been developed to fulfill the needs noted above and therefore has as an object the provision of a plasma jet igniter adapted for high altitude aircraft engine operation. Such an igniter reliably provides enhanced ignition capabilities under adverse operating conditions.

Another object of the invention is to provide a plasma jet igniter which uses the air-fuel mixture produced in the combustor as the plasma medium.

The present igniter differs from a conventional jet aircraft spark igniter in that the electrical discharge which initiates ignition occurs in a small cavity and the high temperature radicals produced in the cavity are ejected as a high velocity jet. The cavity may or may not be supplied with a separate plasma medium.

In a conventional spark igniter, the major ignition mechanism is thermal, and plasma-generated radicals play a secondary role. The advantages of a plasma jet igniter accrue from the chemical effects due to plasma-generated radicals, mostly hydrogen atoms, and aerodynamic effects due to increased penetration depth and increased turbulence levels as the high velocity plasma kernel travels through the fuel-air mixture.

The rate of expansion of the plasma ignition kernel volume can be considered approximately as a product of the flame speed and the flame front area. The chemical effects due to plasma radicals increase the flame speed. The aerodynamic effects due to larger penetration of the plasma kernel and greater flame surface convolution caused by an increased turbulence level increase the flame front area. Both these plasma enhanced chemical and aerodynamic effects are complementary and lead to enhanced ignition capability over a wider range of temperature and pressure conditions as compared to a conventional spark igniter.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In The Drawings:

FIG. 4 is a fragmental central sectional view taken through the firing tip of an igniter configured similar to that of FIG. 8 but without a separate plasma medium source;

FIG. 5 is a view similar to FIG. 4, showing an alternate igniter embodiment in accordance with the invention;

FIG. 6 is a view similar to FIG. 5, showing an alternate igniter embodiment in accordance with the invention provided with a separate feed line for liquid fuel or the like;

In the various figures of the drawing, like reference characters designate like parts.

DETAILED DESCRIPTION OF THE PREFERRED EMBODIMENTS

Figure 1:
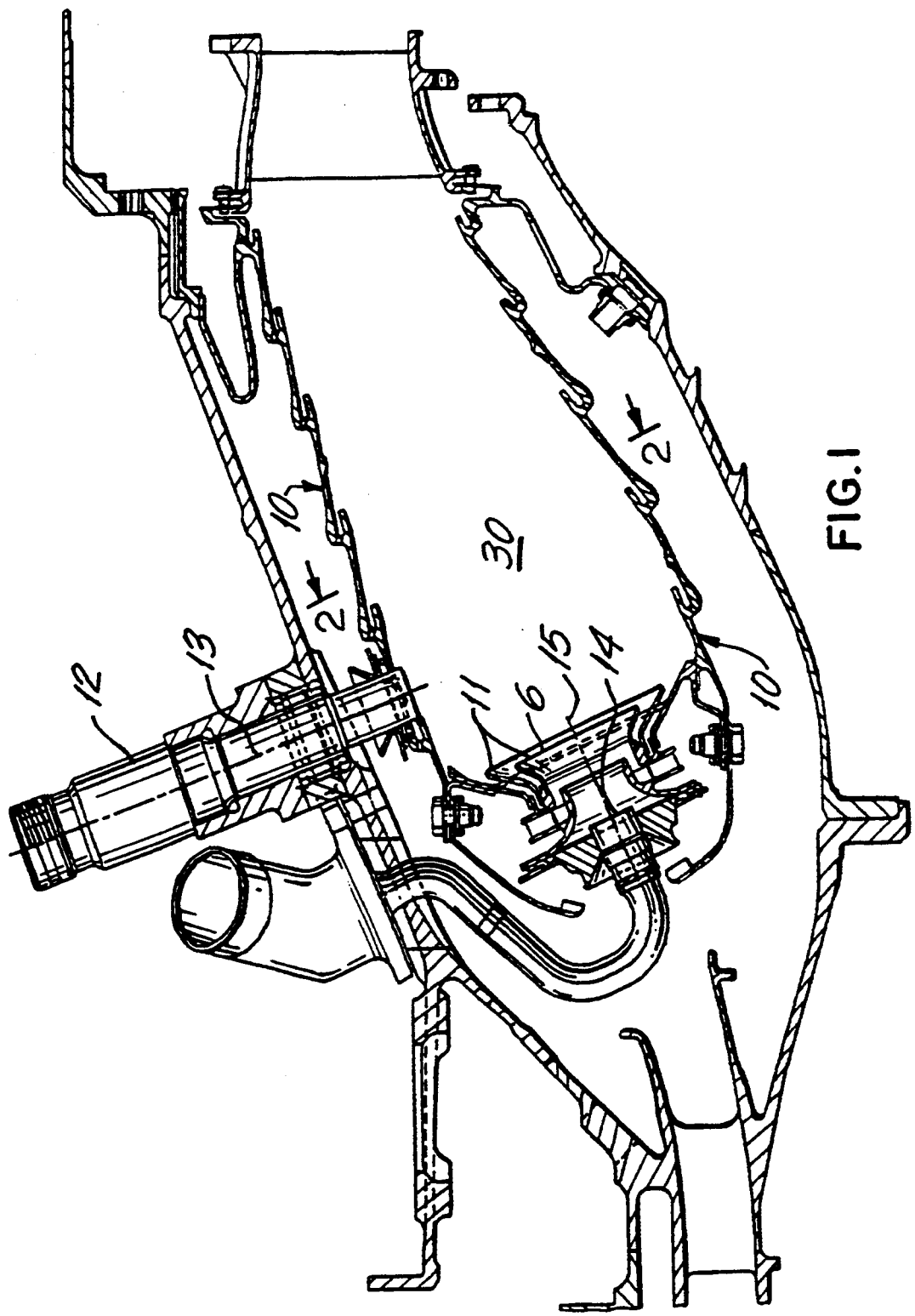
FIG. 1 is a fragmental schematic axial sectional view of a conventional jet engine combustor dome fitted with a plasma jet igniter in accordance with the present invention.

The invention will now be described in conjunction with the drawings, beginning with FIG. 1 which shows a conventional combustor dome 10 of the type currently used in production jet engines. The details of such a combustor are well known. One or more plasma jet igniters 12 may be mounted around combustor dome 10 in a fashion similar to that used with conventional spark igniters.

Figure 2:
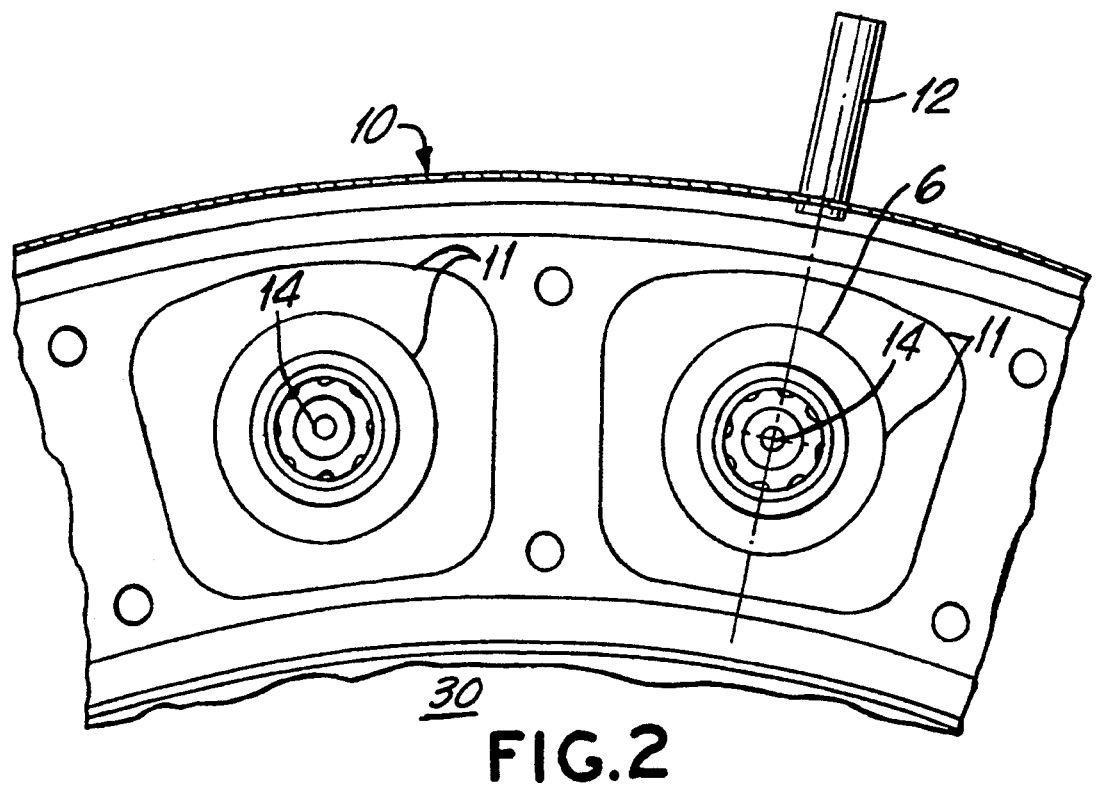
FIG. 2 is a fragmental schematic aft view looking forward taken along line A—A of FIG. 1.

Although only one igniter 12 is shown in FIG. 2, another igniter may be provided diametrically across the combustor dome or spaced, for example, 120° around the circumference of the dome from the illustrated igniter. Several igniters 12 may be mounted in the place of conventional spark igniters or in addition to conventional spark igniters.

Figure 3:
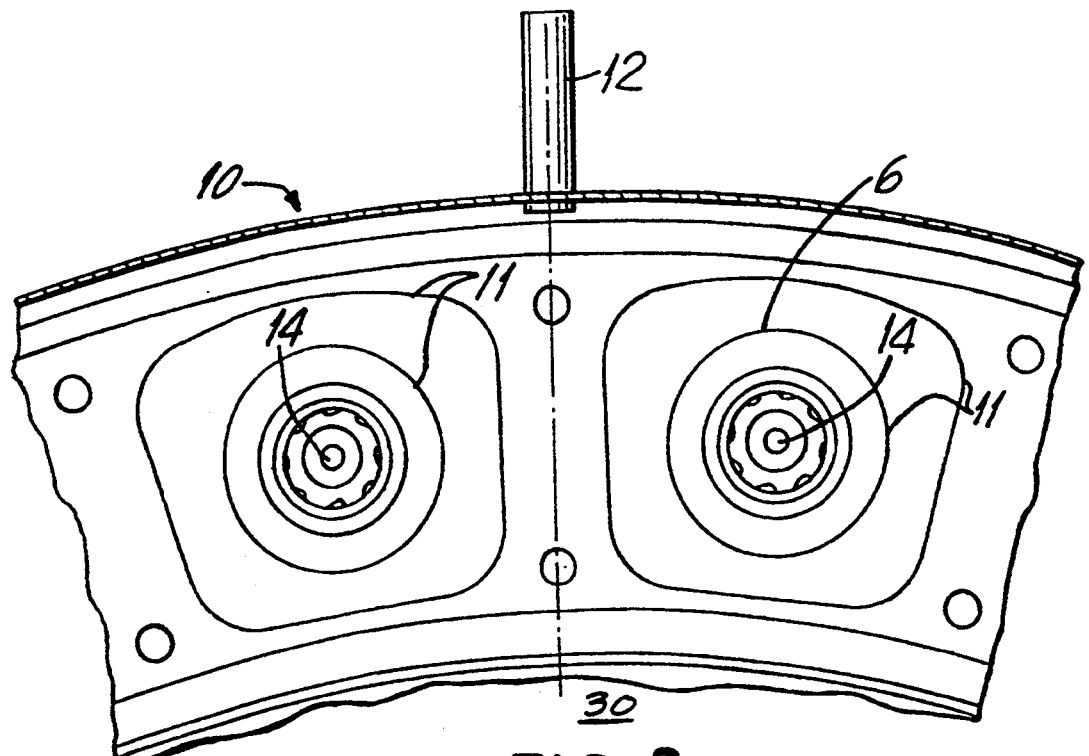
FIG. 3 is a view similar to FIG. 2 showing an alternate arrangement of igniters.

As further seen in FIG. 2, igniters 12 may be mounted in radial alignment with a circumferentially spaced array of fuel injectors 14 or staggered between the fuel injectors as shown in FIG. 3. Twenty to thirty fuel injectors may evenly encircle the forward interior portion of the combustor dome 10 in a known fashion. Conventional splash plates 11 encircle each injector.

In each case, the igniters 12 are located radially outward of the injectors and aligned transversely with respect to the injectors. This arrangement allows the igniters 12 to expel a hot plasma kernel transversely across the path of the fuel issuing from the fuel injectors 14. As seen in the embodiment of FIG. 1, the longitudinal axis 13 of igniter 12 is aligned substantially perpendicular to the direction of fuel issuing from the axis 15 of injector 14.

Although igniters 12 are provided primarily for relighting the air-fuel mixture in combustor dome 10 during flame-out conditions, they may also be used for steady state or continuous ignition operation. FIG. 4 shows the basic features of the firing tip of a plasma jet igniter 12 for aircraft engine applications. The configuration of the cavity 16 within which the plasma is formed significantly affects the performance of the igniter 12.

In the embodiment of FIG. 4, the air-fuel mixture from within the combustor dome 10 enters the cavity 16 and serves as the charge for producing the plasma kernel. This arrangement provides for a simple replacement of existing spark igniters with the plasma igniters 12 without necessitating any significant modification of the existing design of the fuel and ignition systems currently used with conventional spark igniters.

The plasma cavity 16 is the small volume enclosed by the tip 17 of the inner electrode 18, the frusto-conical cavity 20 formed in the endwall 21 of cylindrical ceramic insulator 22, the cylindrical bore 23 formed in the tubular iridium sleeve 24 and the contoured bore 25 formed in the Inconel 600 end cap 26. Bore 25 defines a convergent-divergent supersonic nozzle 28 through which high temperature plasma radicals are ejected into the combustor primary zone 30 (FIG. 1) to relight the engine during flame-out or to enhance steady state ignition.

The size and shape of contoured bore 25 is critical to the satisfactory performance of the igniter as this contouring influences the shape of the plasma discharge and may permit or inhibit the deposition of carbonacious deposits within plasma cavity 16. Bore 25, by its contouring, is differentiated from known igniters of the "recessed gap" variety.

The iridium sleeve 24, which is in electrical contact with the Inconel 600 outer sheath 32 via end cap 26 and/or sleeve 33, serves as a grounded outer electrode. Grounding is achieved through sleeve 33 and outer sheath 32 which is typically grounded to the ground of a conventional electrical ignition system. Iridium sleeve 24 is radially spaced from the outer sheath 32 by the cylindrical sleeve 33 formed of Kovar and is axially and radially spaced from the inner electrode 18 which may be formed of iridium. The plasma discharge is generated by applying a high voltage, short duration electrical pulse across the two electrodes 18,24.

The electrical discharge path initiates from the central inner electrode 18 and travels across the surface of the ceramic insulator 22 to the outer electrode 24, and thence to outer sheath 32 via either the cylindrical Kovar sleeve 33 or the end cap 26 or both. An electrical bond is required in the form of a welded or brazed joint between the iridium sleeve 24 and the Kovar sleeve 33 and between the Kovar sleeve 33 and the outer sheath 32. End cap 26 must have such a bond to the outer sheath 32 only for structural purposes. Since the thermal expansion characteristics of an Inconel 600 end cap 26 are much different from Kovar or iridium, the end cap 26 may or may not be in electrical contact with those materials under a given set of conditions.

Voltages on the order of those presently used with conventional spark igniters are satisfactory for producing the required plasma. In fact, conventional ignition systems may be easily adapted for use with the igniters 12 of the present invention. The electrical pulse generated across electrodes 18,24 ignites the medium within cavity 16 causing a hot plasma kernel to be ejected through nozzle 28 at supersonic speed. In the embodiment shown in FIG. 4, the fuel-air mixture produced in the combustor primary zone 30 fills the cavity 16 and acts as the plasma medium so that no additional fuel charge is required for generating plasma ignition.

The selection of proper materials for the various components of igniter 12 is most important. Kovar, the metallic material which is preferred for sleeve 33, is an alloy trade name representing a material whose coefficient of thermal expansion may be tailored by its alloy composition. Compared to conventional alloys such as Hastelloy or Inconel, Kovar's thermal expansion coefficient is closer to the values exhibited by ceramics and noble metals such as iridium. Kovar provides a desirable mounting for the iridium sleeve 24 by providing both electrical conductivity and mechanical durability over a wide range of temperatures and thermal cycles. Other low expansion metal alloy materials are available which function just as well as Kovar for igniter sleeve applications.

Conventional igniters have experienced thermal stress problems with the use of iridium or other "low expansion" materials as outer electrodes. By supporting the iridium electrode with a Kovar support or a support having a thermal expansion coefficient similar to iridium, the durability and useful life of the iridium electrode may be increased.

Iridium is presently in use as a preferred electrode material for providing long life to the igniters, at reasonable cost. Its combination of high melting point and corrosion resistance is most desirable as well as its ductility and reasonable cost. Inconel 600 is used widely in existing igniters for shell and/or outer electrodes, due to its high resistance to corrosion and high temperature capability.

An acceptable alternative to Iridium as electrode material is Ruthenium. Ruthenium has a functional advantage in some applications in that it reacts with oxygen during service to produce an oxide that is electrical semi-conductive. The presence of semi-conductive deposits in the electrode gap areas of igniters, including device(s) described herein, is beneficial toward creation of electrical discharge in the presence of hydrocarbon fuels. Substitution of Ruthenium for Iridium may be in either the center electrode or outer electrode or both, and does not change the constructions described which involve low expansion elements such as Kovar.

FIG. 5 shows a concept in which a small amount of the jet engine liquid fuel is introduced into the plasma cavity 16 by a small diameter tube or a passage 34 machined in the body of the firing tip portion of igniter 12. Prior igniters have predominantly used hydrogen gas as a separate plasma medium source. In the embodiment of FIG. 5, the engine liquid fuel itself is preferably used as the plasma medium rather than hydrogen due to safety considerations. Hydrogen usually poses considerable safety concerns.

The hydrocarbon fuel, when ignited in plasma cavity 16, dissociates in the spark discharge across electrodes 18,24 and produces H, CH and other radicals which in turn initiate the ignition chain reaction. The plasma cavity fuel may be supplied from the main engine fuel system by a separate solenoid valve (not shown) which is energized when the igniter 12 is turned on. Besides providing a safer environment than possible with the use of hydrogen, the embodiment of FIG. 5 dispenses with the need for a separate fuel tank and fuel delivery system. Fuel passage 34 may simply extend in a parallel flowpath with the fuel supplied to injectors 14.

FIG. 6 depicts a firing tip portion of an igniter 12 which employs a porous sintered metallic sleeve 36. This cylindrical sleeve provides thermal protection in the spark environment by transpirational cooling by the liquid fuel which enters cavity 16 via passage 34.

Figure 7:
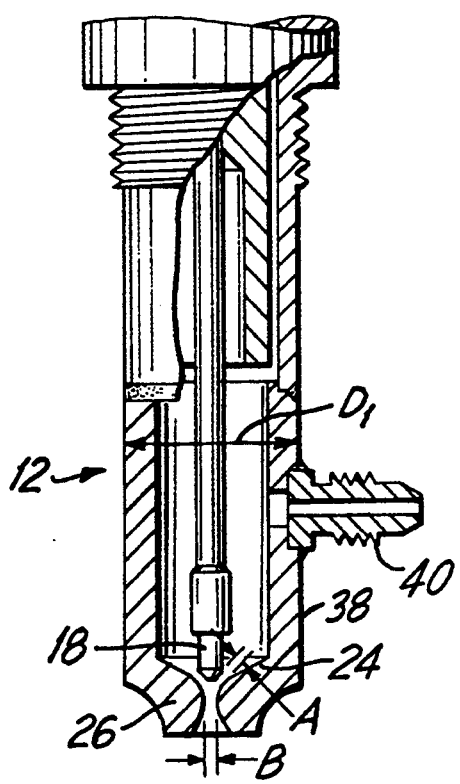
FIG. 7 is a central sectioned view through another igniter embodiment having a pressurized fuel feed line according to the invention.

FIG. 7 shows an alternate igniter wherein a pressurized gas or an ignitable mixture can be pumped or injected into the plasma jet igniter 12 through fitting 40 for purposes of amplifying the plasma emission through the convergent-divergent nozzle end cap 26. Dimension A represents the minimum distance between the electrodes 18,24 and Dimension B represents a corresponding nozzle throat diameter. Values for Dimensions A and B (in inches) may be set as follows:

| A | B |
|---|---|
| .065 | .020 |
| .045 | .010 |
| .055 | .025 |
| .035 | .015 |
| .060 | .030 |
| .030 | .020 |

The igniter of FIG. 7 includes a specially machined inner electrode 18 and an outer electrode firing tip casing 38 which permits evaluation of plasma formation and plasma effects for various electrode gaps A and throat gaps B. The standard fluid fitting 40 may be welded or brazed to casing 38 for connecting the igniter 12 to a source of pressurized gas or fuel. This design was conceived as a relatively rapid way of modifying existing igniters for research and demonstration purposes.

By using the larger diameter D1 for most of the body of the igniter of FIG. 7, sufficient space is available around the center inner electrode 18 so as not to require an insulator in this embodiment. The combustible material entering through fluid fitting 40 normally exhibits the dielectric properties of an insulator until it is reacted in the gap defined by Dimension A. The other embodiments discussed herein represent a variety of igniter tips having a smaller outside diameter which restricts internal space so as to require additional dielectric in the form of, for example, insulator 22. The smaller igniter body diameter of the other embodiments is more common.

Figure 8:
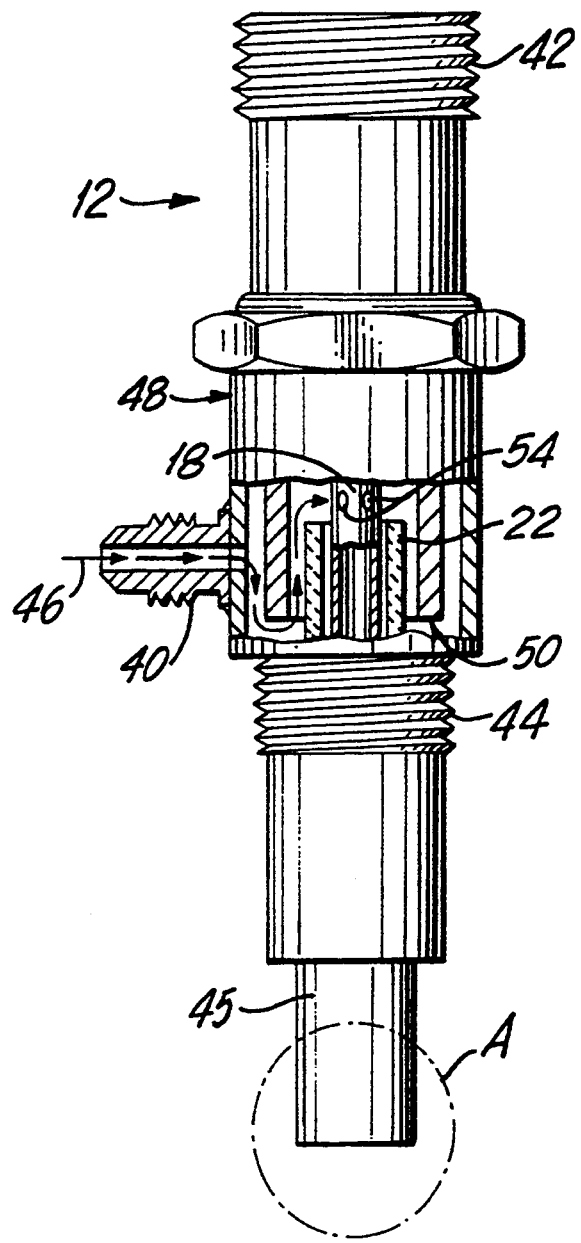
FIG. 8 is a partially sectioned view of a plasma jet igniter adapted for use in a jet engine in accordance with the Invention.

A related design suitable for practical applications is shown in FIG. 8. In the production jet engine plasma igniter configuration of FIG. 8, pressurized fluid is introduced through the casing 48 of the igniter 12 at a point located axially between a threaded electrical connection portion 42 and a mounting thread portion 44 which is required for practical engine assembly. Fuel 46 or any other suitable charge for generating a plasma is admitted to the plasma igniter casing 48 through standard fitting 40.

The fuel, other liquid or charge flows axially and radially along a serpentine path between the casing 48 and a pair of concentrically arranged, axially overlapping, telescoped tubular electrical insulators 50,22. After passing the inner insulator 22, the fuel enters a hollow center electrode 18 through one or more holes or intake ports 54. Electrode 18 and insulator 22 extend axially from at least fitting 40 to the tip portion 45 of igniter 12. Insulators 50,22 as well as electrode 18 are mechanically restrained within casing 48 by sealing features well known to those skilled in the art, the sealing features not being a part of this invention.

Figure 9:
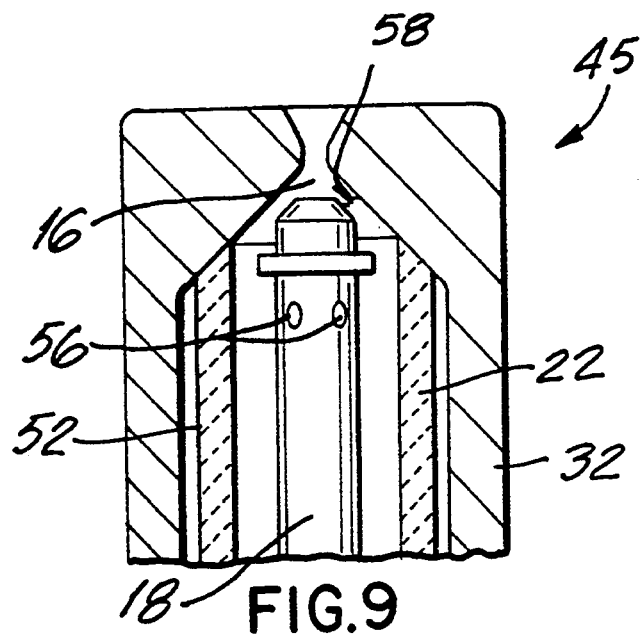
FIGS. 9 and 10 are fragmental central sectional views through two variations of the firing tip of the igniter of FIG. 8 as sectioned and enlarged from region A of FIG. 8.
Figure 10:
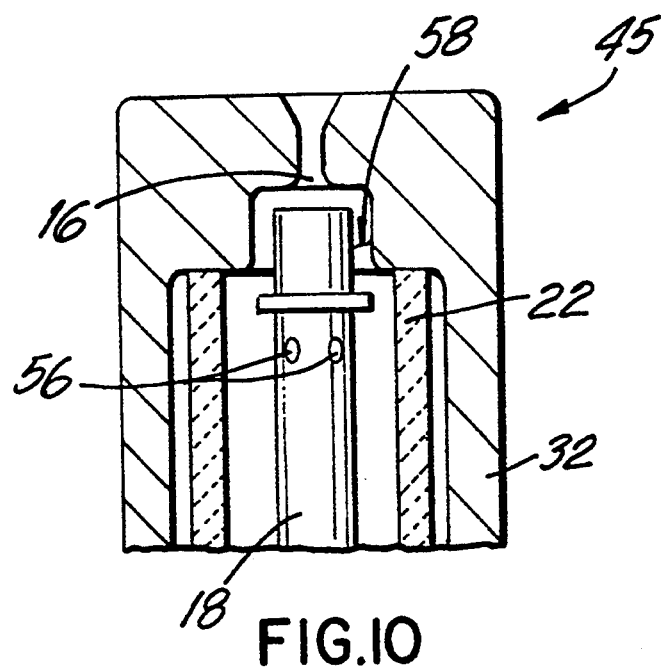

Referring to the firing tip portions 45 of FIGS. 9 and 10 which are shown inverted from the corresponding portion of FIG. 8 from which they have been fragmented, the fuel 46 or other charge exits the hollow center electrode 18 through one or more holes or exit ports 56, and flows or accumulates within the electrical discharge location 58 in tip portion 45, where it is ignited and vaporized into plasma gases. In these embodiments, the outer sheath 32 is machined from a solid metal body. Insulator 22 in FIGS. 8 and 9 is shown as the other end of the same element shown in FIG. 8.

FIGS. 9 and 10 are essentially the same in design except for variations in center electrode mass, and size and shape of the plasma-producing cavity. The shape of the plasma cavities 16 in FIGS. 9 and 10 represents a compromise between several variables affecting life of the igniter, and an optimum volume for several reactions necessary to form the plasma and eject it from the igniter. The most sensitive parameter in this regard is the size of the center hole or "nozzle throat", other parameters remaining constant.

In these figures, the ceramic insulator 22 is used only for electrical insulation purposes and does not perform such a major pressure containment function as it does in FIGS. 4, 5 and 6. The pressure containment function of the ceramic insulator 22 in FIGS. 4, 5 and 6 is much more severe for the ceramic than in the configuration of FIGS. 9 and 10, because in FIGS. 4, 5, and 6 the dissociation reactions and electrical stresses occur immediately adjacent to the ceramic surface, resulting in higher peak pressures and temperatures for the ceramic. In the embodiments shown by FIGS. 9 and 10, the reactions and stresses occur in the space occupied by gaseous/liquid ingredients and the peak temperatures and pressures are dispersed or attenuated by the time the pulsations reach the ceramic.

There has been disclosed heretofore the best embodiment of the invention presently contemplated. However, it is to be understood that various changes and modifications may be made thereto without departing from the spirit of the invention.

What is claimed is:

1. A plasma igniter for a jet engine, comprising:
    a hollow casing generally cylindrical about an axis having an electrical connector portion at a first axial end thereof, a firing tip portion at a second axial end thereof, a mounting portion located intermediate said first and second axial ends, and a hollow fitting located between said electrical connector portion and said mounting portion for admitting a charge into said casing; and
    a hollow electrode mounted within said casing and extending axially from said fitting to said tip portion, said hollow electrode having an intake port formed therein adjacent said tip portion for supplying said charge to said tip portion.

2. The igniter of claim 1, further comprising electrical insulator means disposed within said casing and surrounding said electrode.

3. A plasma igniter for a jet engine, comprising:
    a casing extending generally along an axis thereof and comprising an electrical connector portion, a mounting portion, a firing tip portion, and a hollow fitting located between said electrical connector portion and said mounting portion for admitting a charge into said casing;
    a hollow electrode mounted within said casing and extending axially from said fitting to said tip portion, said hollow electrode having an intake port formed therein adjacent said tip portion for supplying said charge to said tip portion; and
    electrical insulator means surrounding said electrode comprising a pair of axially overlapping tubular insulators.

4. The igniter of claim 3, wherein said tubular insulators define a serpentine path along which said charge flows between said casing and said inner electrode.

5. The igniter of claim 4, wherein said tubular insulators are concentrically arranged in an axially overlapping relationship so as to define a portion of said serpentine path therebetween.

* * * * *